(12) United States Patent
Bellar

(10) Patent No.: US 12,257,604 B2
(45) Date of Patent: Mar. 25, 2025

(54) RELABELING SYSTEM FOR UNLABELED items and method

(71) Applicant: Walmart Apollo, LLC, Bentonville, AR (US)

(72) Inventor: Jason Bellar, Bella Vista, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 131 days.

(21) Appl. No.: 16/706,310

(22) Filed: Dec. 6, 2019

(65) Prior Publication Data

US 2020/0179981 A1    Jun. 11, 2020

Related U.S. Application Data

(60) Provisional application No. 62/776,259, filed on Dec. 6, 2018.

(51) Int. Cl.
*B07C 3/00* (2006.01)
*B07C 3/08* (2006.01)
(Continued)

(52) U.S. Cl.
CPC ............... *B07C 3/006* (2013.01); *B07C 3/08* (2013.01); *B07C 3/14* (2013.01); *B07C 3/18* (2013.01);
(Continued)

(58) Field of Classification Search
CPC .. B07C 3/006; B07C 3/08; B07C 3/10; B07C 3/14; B07C 3/18; B07C 2301/0025;
(Continued)

(56) References Cited

U.S. PATENT DOCUMENTS 3,456,773 A    7/1969  Titmas, Jr.
3,613,910 A   10/1971  Weir
(Continued)

FOREIGN PATENT DOCUMENTS

CA    3122065    6/2019
GB    2565017    1/2019
(Continued)

OTHER PUBLICATIONS

International Search Report and Written Opinion from related International Patent Application No. PCT/US2019/064915 issued Feb. 25, 2020.

(Continued)

*Primary Examiner* — Michael McCullough
*Assistant Examiner* — Molly K Devine
(74) *Attorney, Agent, or Firm* — Fitch, Even, Tabin & Flannery LLP

(57) ABSTRACT

Systems, methods, and machine readable media are provided for relabeling items. A computing device is communicatively coupled to a scanning device, a printing device, and an inventory system. The computing device identifies at least one of the items as missing an expected label type, the expected label indicating a location where the item should be stocked. The system scans the item via the scanning device, queries the inventory system to determine a location for the item. The system prints, via the printing device, a label indicating a location where the item should be stocked in the retail facility, applies the label to the item and sorts the item, via the sorting apparatus, to transport the item to one of the outlets based on the location indicated on the label.

19 Claims, 4 Drawing Sheets

(51) Int. Cl.
  *B07C 3/14* (2006.01)
  *B07C 3/18* (2006.01)
  *B65C 9/40* (2006.01)
  *B65C 9/46* (2006.01)
  *G06K 1/12* (2006.01)
  *G06Q 10/08* (2024.01)

(52) U.S. Cl.
  CPC ............ *B65C 9/40* (2013.01); *B65C 9/46* (2013.01); *G06K 1/121* (2013.01); *G06Q 10/08* (2013.01); *B07C 2301/0025* (2013.01); *B65C 2009/408* (2013.01)

(58) Field of Classification Search
  CPC ....... B65C 9/40; B65C 9/46; B65C 2009/408; G06K 1/121; G06Q 10/08
  USPC .............................. 209/3, 3.2, 3.3, 584, 528
  See application file for complete search history.

(56) References Cited

U.S. PATENT DOCUMENTS

| | | | |
|---|---|---|---|
| 3,621,973 A | 11/1971 | Carlson | |
| 3,771,679 A | 11/1973 | Theml | |
| 4,509,636 A | 4/1985 | Godbois | |
| 4,798,275 A | 1/1989 | Leemkuil | |
| 4,832,204 A | 5/1989 | Handy | |
| 4,962,841 A | 10/1990 | Kloosterhouse | |
| 4,988,435 A | 1/1991 | Kimura | |
| 5,188,210 A | 2/1993 | Malow | |
| 5,238,349 A | 8/1993 | Grace, Sr. | |
| 5,456,347 A | 10/1995 | Best | |
| 5,471,311 A | 11/1995 | van den Bergh | |
| 5,501,571 A | 3/1996 | Van Durrett | |
| 5,687,850 A | 11/1997 | Speckhart | |
| 5,743,375 A | 4/1998 | Shyr | |
| 5,779,023 A | 7/1998 | Hidai | |
| 5,783,810 A | 7/1998 | Kelly | |
| 5,793,633 A | 8/1998 | Noguchi | |
| 5,921,378 A | 7/1999 | Bonnet | |
| 5,984,078 A | 11/1999 | Bonnet | |
| 6,005,211 A | 12/1999 | Huang | |
| 6,230,872 B1 | 5/2001 | Huang | |
| 6,471,044 B1 | 10/2002 | Isaacs | |
| 6,505,733 B2 | 1/2003 | Troupos | |
| 6,554,123 B2 | 4/2003 | Bonnet | |
| 6,644,459 B2 | 11/2003 | van Leeuwen | |
| 6,697,702 B1 | 2/2004 | Hahn-Carlson | |
| 7,118,034 B2 * | 10/2006 | Baldassari | G06K 17/00 235/383 |
| 7,212,884 B2 | 5/2007 | Kappelgaar | |
| 7,221,276 B2 | 5/2007 | Olsen | |
| RE39,747 E | 7/2007 | Gordon | |
| 7,331,471 B1 | 2/2008 | Shakes | |
| 7,426,484 B2 | 9/2008 | Joyce | |
| 7,603,299 B1 * | 10/2009 | Dewey, Jr. | G06Q 10/0631 700/32 |
| 7,668,779 B2 | 2/2010 | Dewitt | |
| 7,695,235 B1 | 4/2010 | Rallis | |
| 7,819,260 B2 | 10/2010 | Leimbach | |
| 7,909,155 B2 | 3/2011 | Lupton | |
| 7,938,315 B2 | 5/2011 | Marks | |
| 7,984,809 B1 | 7/2011 | Ramey | |
| 8,060,243 B2 | 11/2011 | Ogawa | |
| 8,096,402 B2 | 1/2012 | Chastain | |
| 8,186,499 B2 | 5/2012 | Brandt | |
| 8,284,993 B2 | 10/2012 | Taylor | |
| 8,464,947 B2 | 6/2013 | Swan | |
| 8,489,232 B2 * | 7/2013 | Mishra | G06Q 10/08 235/384 |
| 8,575,507 B2 | 11/2013 | Pippin | |
| 8,655,484 B2 | 2/2014 | Stoll | |
| 8,684,169 B2 | 4/2014 | Itoh | |
| 8,738,177 B2 | 5/2014 | van Ooyen et al. | |
| 8,757,363 B2 | 6/2014 | Combs | |
| 8,855,806 B2 | 10/2014 | Hara | |
| 8,924,272 B2 | 12/2014 | Venkatasubramanian | |
| 8,949,148 B2 | 2/2015 | Kumar | |
| 9,004,287 B2 | 4/2015 | Liedl | |
| 9,010,654 B2 | 4/2015 | Bell | |
| 9,020,634 B2 | 4/2015 | Bailey | |
| 9,035,210 B1 | 5/2015 | Davis | |
| 9,141,928 B2 | 9/2015 | Pothukuchi | |
| 9,216,857 B1 | 12/2015 | Kalyan | |
| 9,275,293 B2 | 3/2016 | Broache | |
| 9,290,333 B2 | 3/2016 | Skanse | |
| 9,336,510 B2 | 5/2016 | Dearing et al. | |
| 9,422,116 B1 | 8/2016 | Hase | |
| 9,475,653 B2 | 10/2016 | Dugat | |
| 9,827,598 B2 | 11/2017 | Robbins | |
| 10,087,002 B2 | 10/2018 | Shields | |
| 10,303,987 B2 | 5/2019 | Kotula | |
| 10,507,975 B2 | 12/2019 | Thomas | |
| 10,657,341 B2 | 5/2020 | Wilkinson | |
| 10,661,311 B2 | 5/2020 | Winkle | |
| 10,773,897 B2 | 9/2020 | Schroader | |
| 10,810,534 B2 | 10/2020 | Taylor | |
| 10,835,928 B2 | 11/2020 | Bellar | |
| 10,906,746 B2 | 2/2021 | Schroader | |
| 11,531,953 B2 | 12/2022 | Taylor | |
| 11,868,947 B2 | 1/2024 | Taylor | |
| 11,878,862 B2 | 1/2024 | Bellar | |
| 2002/0084173 A1 | 7/2002 | Paquette | |
| 2002/0092734 A1 | 7/2002 | Troupos | |
| 2003/0106771 A1 | 6/2003 | Takizawa | |
| 2003/0111320 A1 | 6/2003 | van Leeuwen | |
| 2004/0069849 A1 | 4/2004 | Stevens | |
| 2004/0073333 A1 | 4/2004 | Brill | |
| 2004/0098272 A1 | 5/2004 | Kapsis | |
| 2004/0174244 A1 | 9/2004 | Eidemiller | |
| 2004/0243452 A1 | 12/2004 | Barton | |
| 2007/0000990 A1 | 1/2007 | Baldassari | |
| 2007/0261941 A1 | 11/2007 | Pelak | |
| 2008/0023302 A1 | 1/2008 | Groom | |
| 2008/0169170 A1 | 7/2008 | Brommer | |
| 2008/0169171 A1 | 7/2008 | Itoh | |
| 2009/0008450 A1 | 1/2009 | Ebert et al. | |
| 2009/0043594 A1 | 2/2009 | Tseng | |
| 2009/0145723 A1 | 6/2009 | Ogawa | |
| 2009/0272624 A1 | 11/2009 | Edwards | |
| 2009/0294253 A1 | 12/2009 | Eisenberg | |
| 2010/0005011 A1 | 1/2010 | Dewey | |
| 2010/0322473 A1 | 12/2010 | Taylor | |
| 2011/0303564 A1 | 12/2011 | Pearson et al. | |
| 2012/0101956 A1 | 4/2012 | Hyre | |
| 2012/0209741 A1 | 8/2012 | Bonner | |
| 2012/0259655 A1 | 10/2012 | Madreperla | |
| 2012/0290126 A1 | 11/2012 | Combs | |
| 2014/0100769 A1 | 4/2014 | Wurman | |
| 2014/0121826 A1 | 5/2014 | Kreitmeier | |
| 2014/0258165 A1 | 9/2014 | Heil | |
| 2014/0262684 A1 | 9/2014 | Skanse | |
| 2014/0279272 A1 | 9/2014 | Inman | |
| 2015/0144536 A1 | 5/2015 | Dugat | |
| 2015/0210484 A1 | 7/2015 | Itoh | |
| 2015/0259156 A1 | 9/2015 | Henry | |
| 2016/0083196 A1 | 3/2016 | Dugat | |
| 2016/0221766 A1 | 8/2016 | Schroader | |
| 2016/0221768 A1 | 8/2016 | Kadaba | |
| 2016/0232479 A1 | 8/2016 | Skaaksrud | |
| 2016/0275441 A1 | 9/2016 | Barber | |
| 2016/0318714 A1 | 11/2016 | Reischl | |
| 2016/0342917 A1 | 11/2016 | Surapaneni | |
| 2017/0057756 A1 | 3/2017 | Dugat | |
| 2017/0091705 A1 | 3/2017 | Jones et al. | |
| 2017/0137230 A1 | 5/2017 | Combs | |
| 2017/0203335 A1 | 7/2017 | Benyoub | |
| 2017/0330135 A1 | 11/2017 | Taylor et al. | |
| 2017/0357937 A1 * | 12/2017 | Edens | G06K 19/06056 |
| 2018/0036772 A1 | 2/2018 | Pano | |
| 2018/0085788 A1 | 3/2018 | Engel | |
| 2018/0186577 A1 | 7/2018 | Messina | |
| 2018/0224837 A1 | 8/2018 | Enssle | |
| 2018/0253683 A1 | 9/2018 | Taylor | |

(56) References Cited

U.S. PATENT DOCUMENTS

| | | |
|---|---|---|
| 2018/0257872 A1 | 9/2018 | Kuhn |
| 2018/0257873 A1 | 9/2018 | Aljoe |
| 2018/0339865 A1 | 11/2018 | Schroader |
| 2019/0031557 A1 | 1/2019 | Cela Greven |
| 2019/0210814 A1 | 7/2019 | Combs |
| 2019/0270197 A1 | 9/2019 | Wagner |
| 2019/0315574 A1 | 10/2019 | Mehendale |
| 2019/0370745 A1 | 12/2019 | Bellar |
| 2020/0122928 A1 | 4/2020 | Bellar |
| 2020/0189852 A1 | 6/2020 | Karol |
| 2020/0189853 A1 | 6/2020 | Karol |
| 2020/0238339 A1 | 7/2020 | Bellar |
| 2021/0031238 A1 | 2/2021 | Bellar |
| 2023/0079572 A1 | 3/2023 | Taylor |
| 2024/0095650 A1 | 3/2024 | Taylor |
| 2024/0101359 A1 | 3/2024 | Bellar |

FOREIGN PATENT DOCUMENTS

| | | |
|---|---|---|
| GB | 2595400 | 11/2021 |
| GB | 2596431 | 12/2021 |
| WO | 2000000300 | 1/2000 |
| WO | 2005002747 | 1/2005 |
| WO | 2017196916 | 11/2017 |
| WO | 2020118171 | 6/2020 |

OTHER PUBLICATIONS

"Conveyors"; Superior Racking and Shelving Ltd.; http://superiorracking.ie/conveyors/; pp. 1-2.

"Dimensioning, Weighing & Scanning—Buyer's Guide"; Mettler-Toledo Cargosan; published in 2014; pp. 1-52.

Aruna, Y. V. et al.: "Automatic convey or System with In-Process Sorting Mechanism using PLC and HMI System"; Int. Journal of Engineering Research and Applications; vol. 5, Issue 11, (Part-3); published Nov. 2015; pp. 37-42.

Belgianpost; "Taxipost: Automated Parcels Sorting—English"; https://www.youtube.com/watch?v=vN9XRIAys38; published Sep. 30, 2009; pp. 1-6.

Bytronic; "Single Convveyor Unit"; Bytronic Educational Technology; pp. 1-2.

Dabade, Sanjay, et al.; "Automatic Sorting Machine Using Conveyor Belt"; International Journal of Innovative and Emerging Research in Engineering; vol. 2, Issue 5; published in 2015; pp. 66-70.

Jones, Douglas; "Automated Receiving, Saving Money at the Dock Door"; AccunSort Systems Inc.; pp. 1-11.

Oladapo, Bankole, et al.; "Model design and simulation of automatic sorting machine using proximity sensor"; Engineering Science and Technology, an International Journal; publsihed May 9, 2016; pp. 1452-1456.

Seibold, Zazilia et al.; "Layout-Optimized Sorting of Goods with Decentralized Controlled Conveying Modules"; Institute for Material Handling and Logistics, Karlsruhe Institute of Technology; pp. 1-6.

Tripathi, Anoop; "Warehouse Conveyor"; https://www.youtube.com/watch?v=QMdmmB_6PrQ; published Oct. 24, 2013; pp. 1-5.

Vaughan, Mark; "Conveyor Sortation Systems"; http://www.plantengineering.com/search/searchsingledisplay/conveyorsortationsystems/df9a8557f0.html; published on Sep. 1, 1999; pp. 1-6.

G. Black and V. Vyatkin, "Intelligent Component-Based Automation of Baggage Handling Systems With IEC 61499," in IEEE Transactions on Automation Science and Engineering, vol. 7, No. 2, pp. 337-351, Apr. 2010, doi: 10.1109/TASE.2008.2007216. (Year: 2010).

U.S. Appl. No. 16/751,384; Notice of Allowance mailed Jul. 24, 2020; (5 pages).

UKIPO; App No. GB2112112.4; Examination Report mailed Oct. 31, 2022; 5 pages.

UKIPO; App No. GB2112112.4; Examination Report mailed Jan. 16, 2023; 6 pages.

U.S. Appl. No. 18/521,740; Non-Final Rejection mailed Jun. 7, 2024; (pp. 1-19).

U.S. Appl. No. 18/535,866; Non-Final Rejection mailed Aug. 13, 2024; (pp. 1-9).

U.S. Appl. No. 62/466,085, filed Mar. 2, 2017, Robert James Taylor.

U.S. Appl. No. 62/466,095, filed Mar. 2, 2017, Robert James Taylor.

Viscon; "Viscon Logistics—Sorting Systems"; https://www.youtube.com/watch?v=000gDoGXN98; published on Sep. 18, 2014; pp. 1-5.

Pulse Roller; ConveyLinx-Ai2 User's Guide Version 1.5; https://www.pulseroller.com/files/AS/Control%20Literature%20&%20Drawings/ConveyLinx%20Ai/Users%20Manual%20and%20Specifications/Users%20Guide.pdf; Jul. 2019; pp. 1-124.

Mayer, Stephan H. "Development of a completely decentralized control system for modular continuous conveyors." Apr. 1, 2009. University of Karlsruhe, pp. 1-122. (Year: 2009).

Hayslip, Nunzio. A Reconfigurable Simulator for Coupled Conveyors. Diss. University of Akron, 2006. (Year: 2006).

\* cited by examiner

RELABELING SYSTEM FOR UNLABELED items and method

RELATED APPLICATIONS

The present application claims the benefit of and priority to U.S. Provisional Application No. 62/776,259, filed on Dec. 6, 2018, the disclosure of which is incorporated by reference herein in its entirety.

BACKGROUND

In a retail facility, the delivery, unloading, and sorting of items at the facility is an important component of the efficient operation of the facility. These delivery, unloading, and sorting processes often involve unloading items from an external delivery vehicle into the facility. Once within the facility, the items may be scanned, sorted into appropriate categories, and then delivered to various parts of the facility.

SUMMARY

In accordance with embodiments of the present disclosure, a sorting and transport system that is configured to relabel unlabeled items to facilitate sorting and transporting of the unlabeled items is presented. In one embodiment, the system includes a sorting apparatus having a transport section configured to transport items from an inlet of the sorting apparatus to outlets of the sorting apparatus. The system also includes a scanning device disposed between the inlet and the outlets of the sorting apparatus. The scanning device can scan the items as the items are transported passed the scanning device by the transport section. The system further includes a printing device disposed between the scanning device and the outlets of the sorting apparatus.

The system further includes a computing system communicatively coupled to the transport section, the scanning device, the printing device, and/or an inventory system. The computing system is configured to execute a re-labeling module, wherein the re-labeling module, when executed, identifies at least one item as missing an expected label to facilitate subsequent sorting and transport of the at least one item to one of the outlets. The item is determined to be missing an expected label in response to the scanning device failing to scan the expected label on the item. In the event that the scanning device fails to scan the expected label, the scanning device can scan the item for other indicia that can be used to determine an identity of the item. The other indicia can include a UPC code, a barcode, texts or images printed on the item, and the like. The computing system executes the re-labeling module to query the inventory system to determine a location in the retail facility for the item based on scanning the other indicia of the at least one item; prints, via the printing device, a label indicating a location where the item should be stocked in the retail facility; applies the label to the item via the printing device; and sorts the at least one of the items, via the sorting apparatus, to transport the at least one of the items to one of the outlets based on the location indicated on the label and/or a category associated with the item.

In another embodiment, a computer implemented method for relabeling unlabeled items to facilitate sorting and transporting of the unlabeled items is provided. The method includes transporting an item from an inlet of a sorting apparatus to one of the outlets of the sorting apparatus. The method also includes identifying an item as missing an expected label in response to the scanning device failing to scan the expected label as the item is being transported past the scanning device and towards the plurality of outlets by the sorting apparatus. The expected, but missing label, would have indicated a location where the item should be stocked in the retail facility. The method also includes scanning the item by the scanning device as the item is transported by the sorting apparatus to detecting other indicia after it is determined that the expected label is missing. The method additionally includes querying an inventory system to determine a location in the retail facility for the item based on the scanning of other indicia on the item, printing a label indicating a location where the item should be stocked in the retail facility, applying the label to the item, and sorting the item, via the sorting apparatus, to transport the item to the outlet in response scanning the label applied to the item and based on the location indicated on the label and/or a category associated with the item.

In another embodiment, a non-transitory machine-readable medium is provided that stores instructions executable by a processing device to implement a method for relabeling unlabeled item to facilitate sorting and transporting of the unlabeled item is provided. The method includes transporting an item from an inlet of a sorting apparatus to one of the outlets of the sorting apparatus. The method also includes identifying an item as missing an expected label in response to the scanning device failing to scan the expected label as the item is being transported past the scanning device and towards the plurality of outlets by the sorting apparatus. The expected, but missing label, would have indicated a location where the item should be stocked in the retail facility. The method also includes scanning the item by the scanning device as the item is transported by the sorting apparatus to detecting other indicia after it is determined that the expected label is missing. The method additionally includes querying an inventory system to determine a location in the retail facility for the item based on the scanning of other indicia on the item, printing a label indicating a location where the item should be stocked in the retail facility, applying the label to the item, and sorting the item, via the sorting apparatus, to transport the item to the outlet in response scanning the label applied to the item and based on the location indicated on the label and/or a category associated with the item.

BRIEF DESCRIPTION OF THE DRAWINGS

The accompanying drawings, which are incorporated in and constitute a part of this specification, illustrate one or more embodiments of the present disclosure and, together with the description, help to explain embodiments of the present disclosure. The drawings are not necessarily to scale, or inclusive of all elements of a system, emphasis instead generally being placed upon illustrating the concepts, structures, and techniques sought to be protected herein. In the drawings.

DETAILED DESCRIPTION

Exemplary embodiments provide an automated sorting and relabeling system for one or more items. Items are received at a facility and processed. The items are processed using an automated sorting and transport system that includes a sorting apparatus having main conveyor system and multiple secondary conveyor systems each forming a transport section of the sorting apparatus. Each of the secondary conveyor systems can be associated with one or more specific item categories or types and/or one or more storage locations in a facility. The automated sorting and transport system can attempt to scan a label of each item being unloaded. The label can include information that can be used by the sorting and transport system to determine to which of the secondary conveyor systems to route the items. The labels are typically applied to the items prior to receipt at a facility and/or prior to receipt by the sorting and transport system. In some instances, a label may be missing from or unreadable on an item when it is received by the sorting and transport system and the sorting and transport system can be unable to determine to which of the secondary conveyor system to route the item.

A computing system executes a relabeling module which may include various circuits, circuitry and one or more software components, programs, applications, or other units of code base or instructions configured to be executed by one or more processors.

The relabeling module may be a hardware and/or software-implemented module configured to scan incoming items as they are unloaded and made ready for delivery or storage within a facility. The items that have labels are scanned using by a scan module reads and that label is used to identify the item and determine how the item should be handled. When an item is missing a label or the label unreadable, the relabeling module prints a label based on other information on the item and using real-time inventory information to identify the item and determine how the item should be handled.

Figure 1:
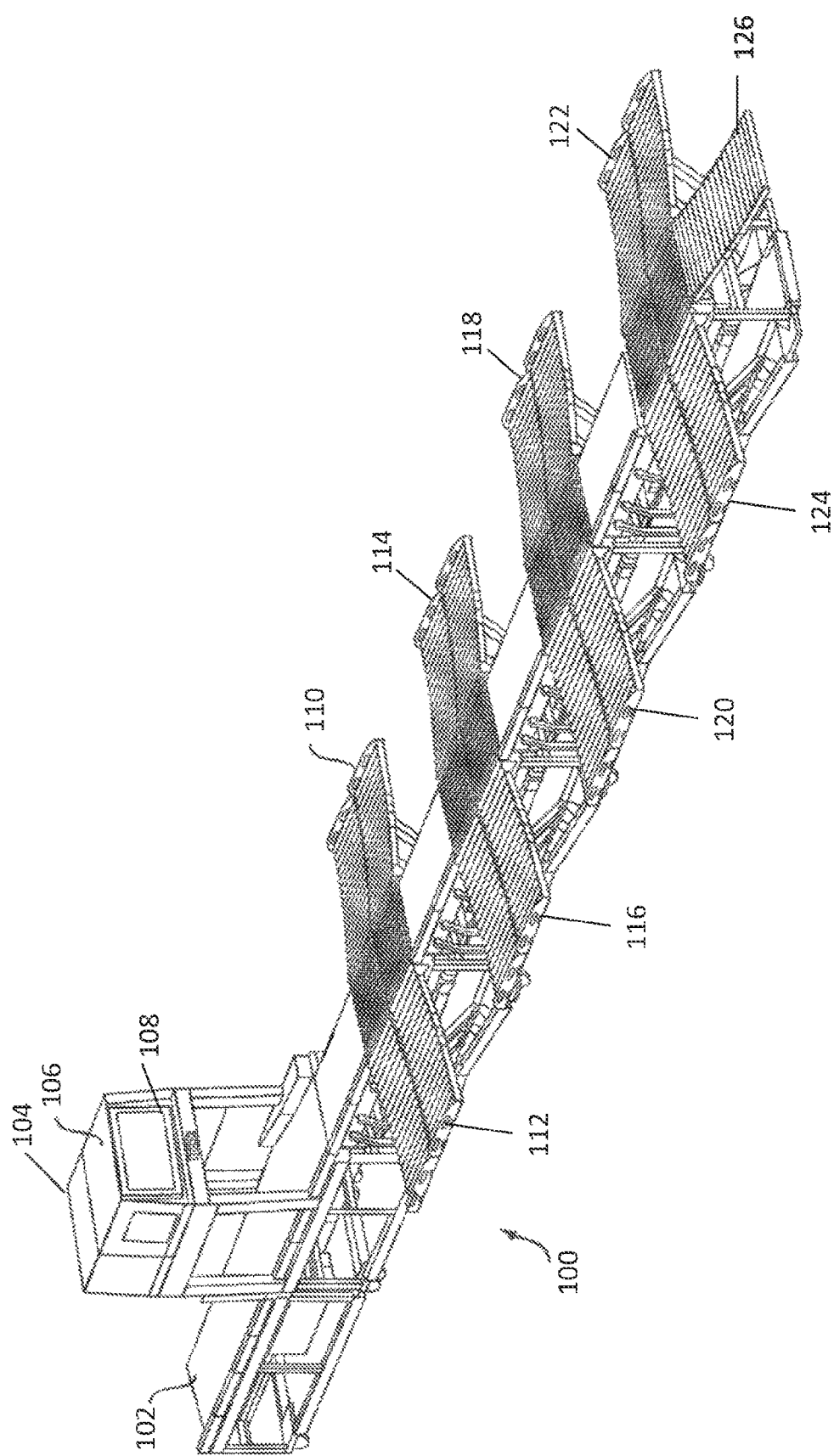
FIG. 1 is a diagram of a sorting and transport system for items, according to an example embodiment.

Referring to FIG. 1, a receiving system such as a sorting and transportation system 100 is used as an intake system to unload a delivery items from a vehicle into a facility, such as a retail environment. The system 100 can include sorting apparatus having one or more transport sections, a scanner 104, a printing device 106, a system controller 108, a computing system 110, a database 112, and an inventory system 114. The system controller 108 can be in communication with the computing system 110 and the inventory system 114 via a communications network 105. The one or more transport sections can include a main conveyor 102 and/or secondary conveyors 110-126. Items are loaded onto the main conveyor portion 102 of the system 100 at an inlet 101 and each item is routed to one of the outlets 103 of the system 100. The outlets of the system 100 can be reached via the secondary conveyors 110-126 based on a sorting label affixed to each item. The main conveyor portion 102 transports the items passed the scanner 104, which scans the items for sorting labels. Based on the scanned information from the labels, the system controller 108 determines to which of the secondary conveyors 110-126 the items are to be routed.

In some instances, it may be determined that a sorting label expected to be affixed to an item is missing or compromised such that the scanner 104 is unable to detect or read the label on the item. The system 100 is unable to route the item with the missing or comprised label to an appropriate or assigned one of the secondary conveyors 110-126 without the information included on the label. In such an instance, the scanner 104 attempts to scan the item for other indicia from which item identifying information can be detected. The other indicia may include a Universal Item Code (UPC), a manufacturer's item UPC, printed item information using text recognition, images, or a Digimark® image reading. Upon detection of other indicia, the scanner 104, via the system controller 108, can transmit the indicia to the computing system 110, which can process the indicia and query a database 112 to identify the item based on the detected indicia.

Once an item that is missing a label or includes an unreadable label is identified by the computing system 110 based on an output of the scanner 104, the computing system 110 can query the inventory system 114 to determine where the item is needed. The inventory system 114 can be a real-time inventory system that can dynamically allocate items based on real-time inventory requirements. Thus, the system 100 can determine at the time the item is identified that the item is needed in a location that is different the location that was previously assigned to the item.

The computing system 110 can generate a sorting label for the item and instruct the printer device 106, via the system controller 108, to print the label for the item being processed that does not have an expected label. The label identifies a location where the item should be stocked, which may include an aisle identifier, a section identifier, a shelf identifier, or a number. The printer device 106 prints the label and applies the label to the item. After the label is printed and applied to the item, the label can be re-scanned by scanning device 104.

After the item is re-scanned and the label is detected, the outlet of the system to which the item is to be transported can be determined by the system controller 108 and the system controller 108 can control the main conveyor 102 and one of the second conveyors 110-126 to transport to the item to the assigned outlet. The system controller 108 can control different sets of rollers of the main conveyor 102 and/or the second conveyors 110, 112, 114, 116, 118, 120, 122, 124 and 126 such that the item is directed to the appropriate location output location of the system 100 based on the scanned label of the item. For example, each one of the secondary conveyors 110-126 can be associated with a different category or type of item and/or with a different location in the retail facility to which the item will be delivered.

Figure 2:
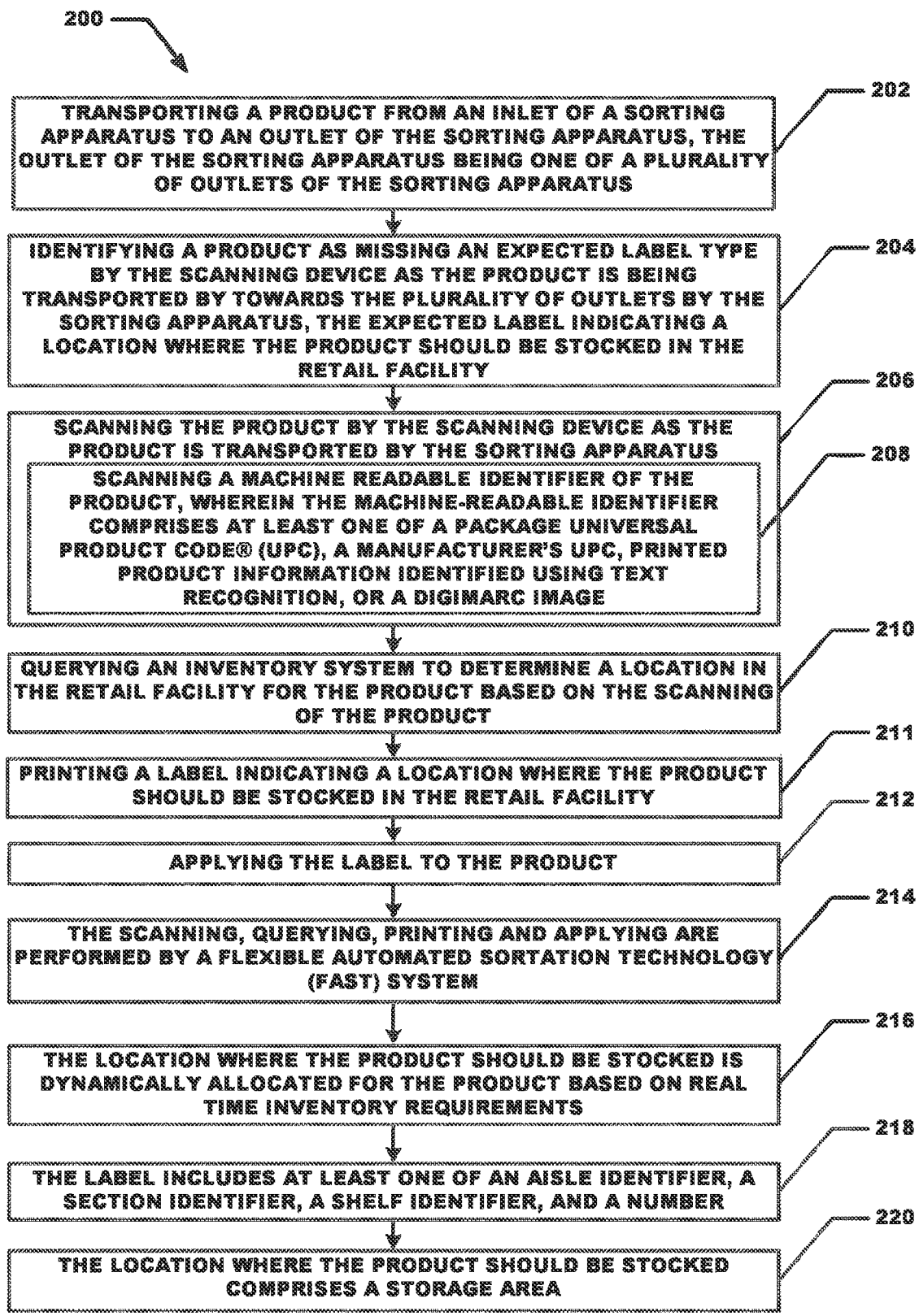
FIG. 2 is a flow diagram of a process for relabeling unlabeled items, according to an example embodiment.

Referring now to FIG. 2, a flow diagram of an example embodiment of a process 200 for relabeling unlabeled items is shown. In exemplary embodiments, an unlabeled item refers to an item that is missing a label or that has an unreadable label. The process 200 begins at operation 202 where an item is transported from an inlet of a sorting and transport system (e.g., an embodiment of the system 100) towards one of the outlets of the sorting and transport system.

In operation 204, as the item is being transported by towards the outlets by the transport sections of the sorting apparatus, an item is identified as missing an expected label by the scanning device. The expected label that is missing would have indicated a location where the item should be stocked in the retail facility and/or to which of the outlets of the sorting and transport system the item should be routed. For example, the item can be a box of footballs that should be routed to the outlet of the system corresponding to the sporting goods department.

In operation 206, the unlabeled item is re-scanned by the scanning device as the item is transported by the sorting and transport system to detect other indicia, such as a machine-readable identifier on the item, is scanned, wherein the machine-readable identifier can be at least one of a package Universal Item Code® (UPC), a manufacturer's UPC, printed item information identified using text recognition and/or image recognition, or a Digimark image.

In operation 208, the other indicia is transmitted from the scanner device to a computing system via the system controller of the sorting and transport system. The computing system determines the identity of the item based on the other indicia received from the scanner device and in operation 210, queries the inventory system to determine a location in the retail facility for the item based on the determined identity of the item. In operation 212, a label indicating a location where the item should be stocked in the retail facility is generated by the computing system 214, which instructs the printing device to print the label 211. The label can include a location where the item should be stocked, which can be dynamically allocated for the item based on real time inventory requirements 216. For example, the item is identified as a soccer ball, and it may be determined that the sporting goods department is low on this type of soccer ball at the time the identity of the soccer ball is determined and the system can determine the soccer ball should be delivered to the sporting goods department area as opposed to a stocking area. In some embodiments, the label includes at least one of an aisle identifier, a section identifier, a shelf identifier, and a number 218. The location where the item should be stocked comprises a storage area 220.

In operation 211, the printing device prints the label. In operation 212, the printed label is applied to the item, wherein the item can be further processed based on the printed label. In operation 206, the scanner device re-scans the item to detect the label and, in operation 202, the system controller of the sorting and transport system controls the main conveyor and at least one of the secondary conveyors to transport the item to an outlet associated with the information included on the label.

Figure 3:
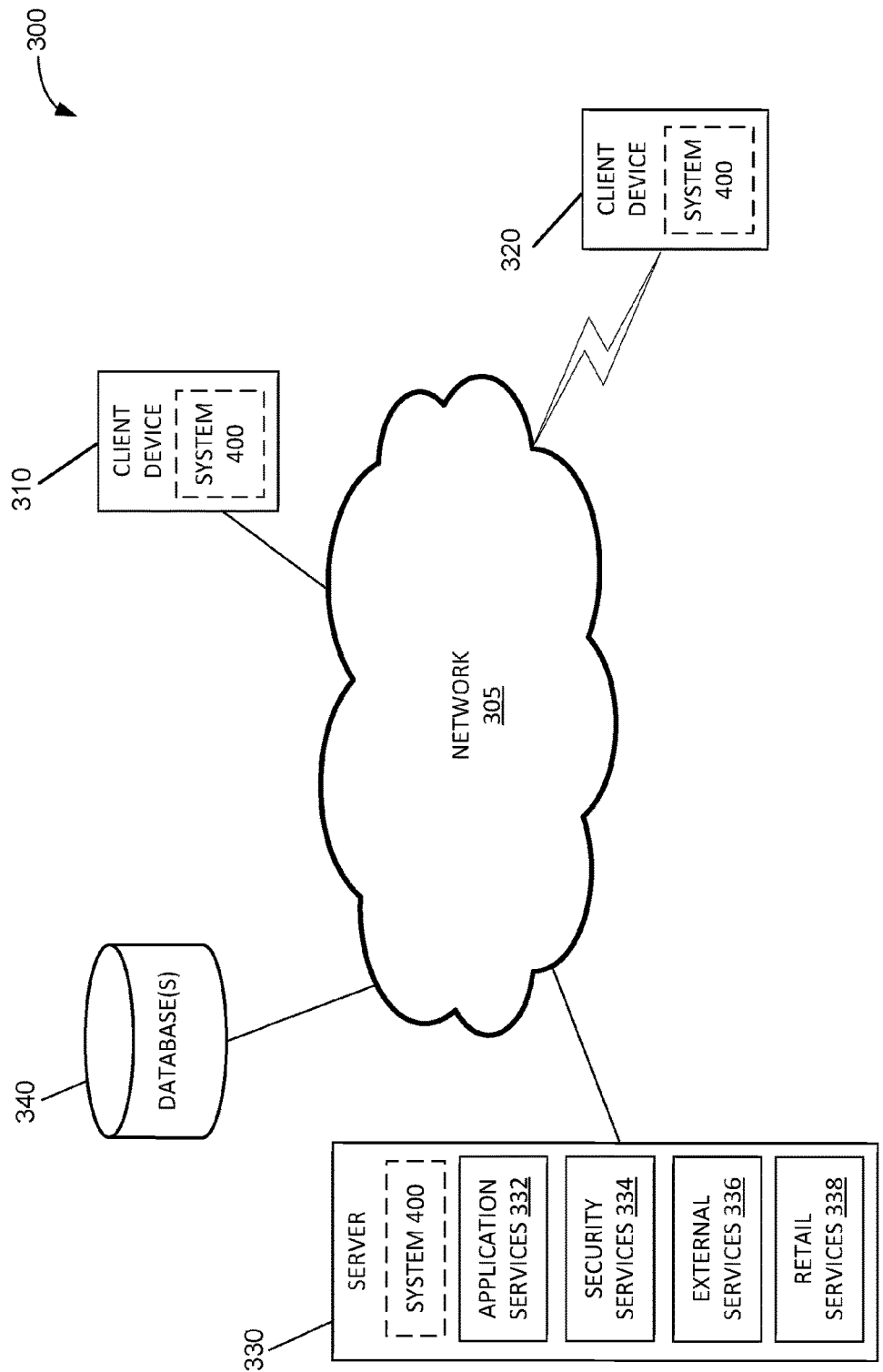
FIG. 3 is a diagram of an exemplary network environment suitable for relabeling unlabeled items, according to an exemplary embodiment.

FIG. 3 illustrates a network diagram depicting an embodiment of a system 300 for relabeling items, according to an example embodiment. The system 300 can include a network 305, multiple computing devices, for example, client device 310, client device 320, a server 330, and database(s) 340. The system 300 can also include an embodiment of the sorting apparatus including the main conveyor 102 and secondary conveyors 110-126, and can include the scanner device 104 and the printing device 106. Each of the client devices 310, 320, server 330, and database(s) 340 is in communication with the network 305.

In an example embodiment, one or more portions of network 305 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client devices 310, 320 and server 330 may comprise computing devices. The client devices can be, but are not limited to, mobile devices, hand-held devices, wireless devices, portable devices, wearable computers, cellular or mobile phones, portable digital assistants (PDAs), smart phones, smart watches, tablets, ultrabooks, netbooks, laptops, desktops, multi-processor systems, microprocessor-based or programmable consumer electronics, and the like. Each of client devices 310, 320 and server 330 may connect to network 305 via a wired or wireless connection. In an example embodiment, the client devices 310, 320 and/or the server 330 may perform one or more of the functionalities of the system for sorting and relabeling items described herein, or transmit data or signals to the system described herein to facilitate sorting and relabeling items. The client device 310, 320 and/or the server 330 can include one or more components of computing device 400 of FIG. 4.

The database(s) 340 comprise one or more storage devices for storing data and/or instructions (or code) for use by the server 330 and/or the client devices 310, 320. Each of the database(s) 340 and the server 330 is connected to the network 305 via a wired connection. Alternatively, one or more of the database(s) 340 and server 330 may be connected to the network 305 via a wireless connection. The server 330 comprises one or more computers or processors configured to communicate with the client devices 310, 320 via network 305. The server 330 can include one or more components of device 400 of FIG. 4. Server 330 hosts one or more software systems, applications or websites, including one or more components of the system 100 described herein and/or facilitates access to the content of database(s) 340.

In an example embodiment, the server 330 also includes various software services 332, 334, 336, 338 that facilitate the functionalities of the system 100 for sorting and relabeling items. Database(s) 340 and server 330 may be located at one or more geographically distributed locations from each other or from client devices 310, 320. Alternatively, database(s) 340, 345 may be included within server 330.

Figure 4:
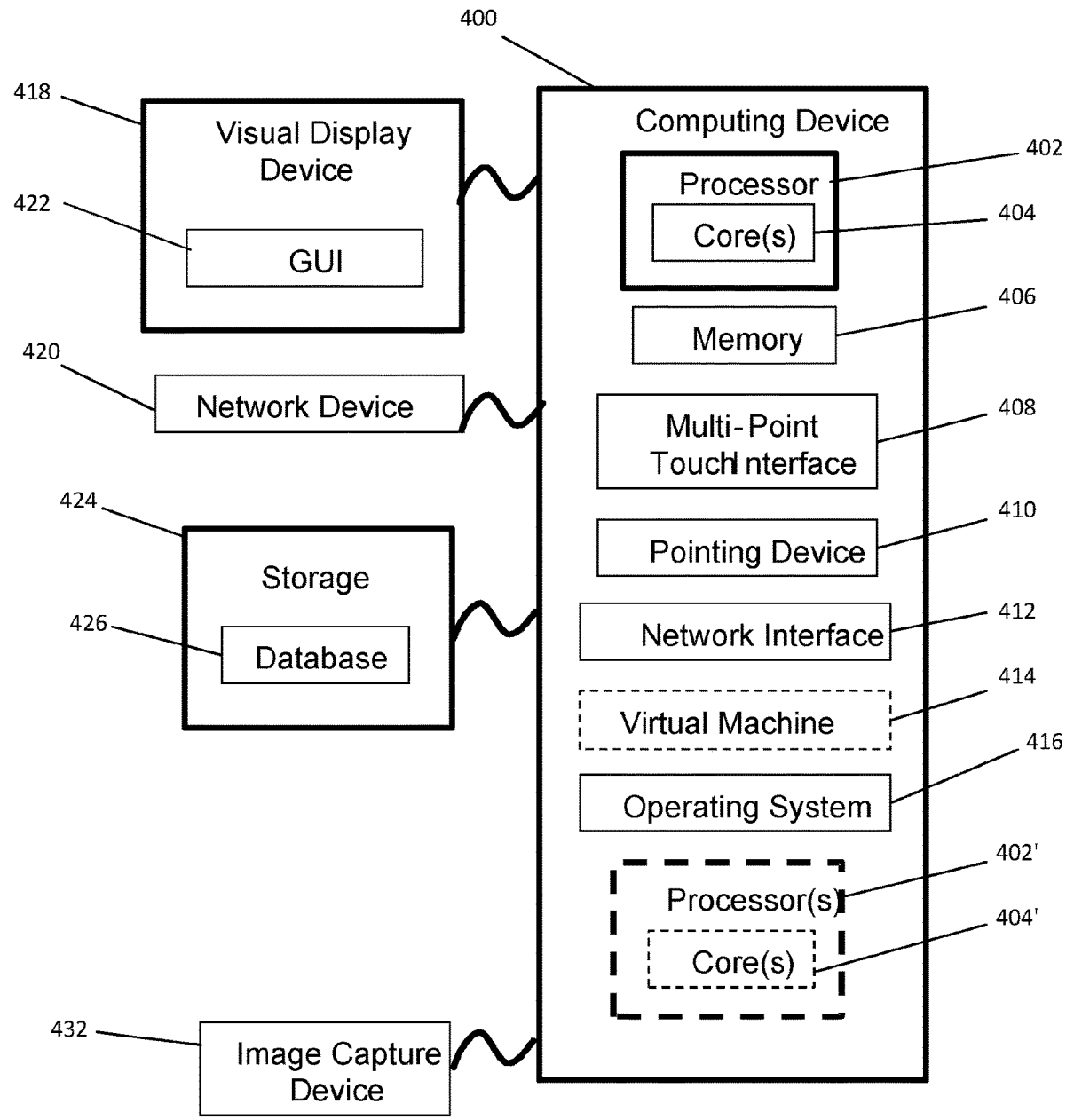
FIG. 4 is a block diagram of an exemplary computing device that may be used to implement exemplary embodiments described herein.

FIG. 4 is a block diagram of an exemplary computing device 400 that can be used to perform one or more operations of the processes described herein. For example, the client device 310, 320 and the server 330, as described in FIG. 3, may each be embodied as the computing device 400. The computing device 400 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flash-drives), and the like. For example, memory 406 included in the computing device 400 can store computer-readable and computer-executable instructions or software for implementing exemplary embodiments. The computing device 400 also includes processor 402 and associated core 404, and optionally, one or more additional processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor (s) 402' can each be a single core processor or multiple core (404 and 404') processor.

Virtualization can be employed in the computing device 400 so that infrastructure and resources in the computing device can be shared dynamically. A virtual machine 414 can be provided to handle a process running on multiple processors so that the process appears to be using only one computing resource rather than multiple computing resources. Multiple virtual machines can also be used with one processor.

Memory 406 can include a computer system memory or random access memory, such as DRAM, SRAM, EDO RAM, and the like. Memory 406 can include other types of memory as well, or combinations thereof. An individual can interact with the computing device 400 through a visual display device 418, such as a touch screen display or computer monitor, which can display one or more graphical user interfaces 422 for receiving data from a user. The visual display device 418 can also display other aspects, elements and/or information or data associated with exemplary embodiments. The computing device 400 can include other I/O devices for receiving input from a user, for example, a keyboard or another suitable multi-point touch interface 408, a pointing device 410 (e.g., a pen, stylus, mouse, or trackpad). The keyboard 408 and the pointing device 410 can be coupled to the visual display device 418. The computing device 400 can include other suitable conventional I/O peripherals, such as image capture device 432.

The computing device 400 can also include one or more storage devices 424, such as a hard-drive, CD-ROM, or other computer readable media, for storing data and computer-readable instructions and/or software to facilitate one or more operations of the processes described herein for embodiments of the system 100 shown in FIG. 1. For example, the storage devices 424 can store applications 426 (e.g., such as the relabeling module) that can be executed by the processing device(s) 402, 402' to perform the processes described herein. Exemplary storage device 424 can also store one or more databases for storing suitable information required to implement exemplary embodiments. The databases can be updated by an individual or automatically at a suitable time to add, delete or update one or more items in the databases. Exemplary storage device 424 can store one or more databases 426 for storing provisioned data, and other data/information used to implement exemplary embodiments of the systems and methods described herein.

The computing device 400 can include a network interface 412 configured to interface via one or more network devices 420 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 can include a built-in network adapter, network interface card, PCMCIA network card, card bus network adapter, wireless network adapter, USB network adapter, modem or another device suitable for interfacing the computing device 400 to a type of network capable of communication and performing the operations described herein. Moreover, the computing device 400 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 400 can run an operating system 416, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 416 can be run in native mode or emulated mode. In an exemplary embodiment, the operating system 416 can be run on one or more cloud machine instances.

The description is presented to enable a person skilled in the art to create and use a computer system configuration and related method and systems for modifying capacity for a new retail facility. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A system for relabeling an unlabeled item to facilitate sorting and transporting of the unlabeled item, the system comprising:
 a sorting apparatus including at least one conveyor configured to transport items from an inlet of the sorting apparatus towards a plurality of outlets of the sorting apparatus;

a scanner disposed between the inlet and the plurality of outlets of the sorting apparatus, the scanner configured to scan the items as the items are transported past the scanner by the sorting apparatus;

a printer disposed between the scanner and the plurality of outlets of the sorting apparatus;

inventory data identifying locations at a facility for stocking of the items at the facility;

a computing system in communication with the scanner, the printer, and the inventory data, the computing system configured to execute re-labeling instructions, such that, when executed, the computing system:

identifies via the scanner, an item as missing a predetermined label type to facilitate subsequent sorting and transport of the item to a destination by failing to detect the predetermined label type during scanning, the predetermined label type indicating a location where the item should be stocked in the facility;

after identifying that the item is missing the predetermined label type, scans the item via the scanner again and detects indicia, other than the predetermined label type, from which item identifying information can be determined;

identifies the item based on the indicia;

accesses the inventory data to determine a location in the facility where the identified item should be stocked;

prints, via the printer, a label indicating the location where the item should be stocked in the facility;

re-scans the item via the scanner to detect the printed label applied to the item missing the predetermined label type and determines an associated outlet of the plurality of the outlets of the sorting apparatus corresponding to the item; and sorts the item, via the sorting apparatus, to transport the item to the associated outlet of the plurality of outlets corresponding to the location where the item should be stocked in the facility indicated on the label.

2. The system of claim 1, wherein the indicia comprise a machine readable identifier.

3. The system of claim 1, wherein the location where the item should be stocked at the facility is dynamically allocated for the item based on real time inventory requirements.

4. The system of claim 3, wherein the location the item should be stocked comprises a storage area.

5. The system of claim 1, wherein the label identifying a location at the facility where the item should be stocked includes at least one of an aisle identifier, a section identifier, and a shelf identifier.

6. The system of claim 1, wherein the indicia comprise a barcode affixed to the item.

7. The system of claim 1, wherein the computing system, when executed: applies the label to the item via the printer.

8. The system of claim 1, wherein the predetermined label type indicates a location where the item should be stocked at the facility, the predetermined label type including information for use by an individual to transport the item from a conveyor location to the stocking location for the item at the facility.

9. The system of claim 1, wherein the re-scanning of the item via the scanner to detect the printed label applied to the item missing the predetermined label type is performed prior to attempted sorting of the item by the sorting apparatus.

10. A method for relabeling an unlabeled item to facilitate sorting and transporting of the unlabeled item, the method comprising:

transporting an item from an inlet of a sorting apparatus to an outlet of the sorting apparatus, the outlet of the sorting apparatus being one of a plurality of outlets of the sorting apparatus;

identifying an item as missing a predetermined label type by a scanner by failing to detect the predetermined label type during scanning as the item is being transported towards the plurality of outlets by the sorting apparatus, the predetermined label type indicating a location where the item should be stocked in a facility;

after identifying that the item is missing the predetermined label type, scanning the item again by the scanner as the item is transported by the sorting apparatus and detecting indicia, other than the predetermined label type, from which item identifying information can be determined;

identifying the item based on the indicia;

accessing inventory data identifying locations at the facility for stocking of items at the facility to determine a location in the facility where the identified item should be stocked;

printing a label indicating the location where the item should be stocked in the facility;

re-scanning the item via the scanner to detect the printed label applied to the item missing the predetermined label type and determines an associated outlet of the plurality of the outlets of the sorting apparatus corresponding to the item; and sorting the item, via the sorting apparatus, to transport the item to the associated outlet in response to scanning the label applied to the item, the outlet corresponding to the location where the item should be stocked in the facility indicated on the label.

11. The method of claim 10, wherein the indicia comprise a machine readable identifier.

12. The method of claim 11, wherein the location at the facility where the item should be stocked is dynamically allocated for the item based on real time inventory requirements.

13. The method of claim 12, wherein the location where the item should be stocked comprises a storage area.

14. The method of claim 11, wherein the label includes at least one of an aisle identifier, a section identifier, and a shelf identifier.

15. A non-transitory computer-readable medium for relabeling an unlabeled item in a facility, having stored thereon, instructions that when executed in a computing system, cause the computing system to perform operations comprising:

identifying an item as missing a predetermined label type by a scanner by failing to detect the predetermined label type during scanning as the item is being transported towards a plurality of outlets by a sorting apparatus, the predetermined label type indicating a location where the item should be stocked in a facility;

after identifying that the item is missing the predetermined label type, scanning the item again by the scanner as the item is transported by the sorting apparatus and detecting indicia, other than the predetermined label type, from which item identifying information can be determined;

identifying the item based on the indicia;

accessing inventory data identifying locations at the facility for stocking of items at the facility to determine a location in the facility where the identified item should be stocked;

printing a label indicating the location where the item should be stocked in the facility;

re-scanning the item via the scanner to detect the printed label applied to the item missing the predetermined label type and determines an associated outlet of the plurality of the outlets of the sorting apparatus corresponding to the item; and sorting the item, via the sorting apparatus, to transport the item to the associated outlet in response to scanning the label applied to the item, the outlet corresponding to the location where the item should be stocked in the facility indicated on the label.

16. The non-transitory computer-readable medium of claim 15 wherein the indicia comprise a machine readable identifier.

17. The non-transitory computer-readable medium of claim 16 wherein the location at the facility where the item should be stocked is dynamically allocated for the item based on real time inventory requirements.

18. The non-transitory computer-readable medium of claim 17 wherein the location where the item should be stocked comprises a storage area.

19. The non-transitory computer-readable medium of claim 15 wherein the label identifying the location where the item should be stocked includes at least one of an aisle identifier, a section identifier, and a shelf identifier.

* * * * *

UNITED STATES PATENT AND TRADEMARK OFFICE
CERTIFICATE OF CORRECTION

PATENT NO. : 12,257,604 B2
APPLICATION NO. : 16/706310
DATED : March 25, 2025
INVENTOR(S) : Jason Bellar It is certified that error appears in the above-identified patent and that said Letters Patent is hereby corrected as shown below:

On the Title Page

In Item (54), and in the Specification, under "Title", in Column 1, Line 2, delete "items and method" and insert -- ITEMS AND METHOD --, therefor.

On Page 3, in Item (56), under "Other Publications", in Column 1, Line 12, delete "Convveyor" and insert -- Conveyor --, therefor.

On Page 3, in Item (56), under "Other Publications", in Column 2, Line 5, delete "publsihed" and insert -- published --, therefor.

In the Claims

In Column 9, Claim 4, Line 45, delete "the item" and insert -- where the item --, therefor.

In Column 11, Claim 16, Line 14, delete "claim 15" and insert -- claim 15, --, therefor.

In Column 11, Claim 17, Line 17, delete "claim 16" and insert -- claim 16, --, therefor.

In Column 11, Claim 18, Line 21, delete "claim 17" and insert -- claim 17, --, therefor.

In Column 11, Claim 19, Line 24, delete "claim 15" and insert -- claim 15, --, therefor.

Signed and Sealed this
Twenty-sixth Day of August, 2025

Coke Morgan Stewart
*Acting Director of the United States Patent and Trademark Office*